United States Patent Office 3,537,948
Patented Nov. 3, 1970

1

3,537,948
ELASTOMERIC GLASS FIBER REINFORCED STRUCTURES
Alfred Marzocchi, Cumberland, R.I., assignor to Owens-Corning Fiberglas Corporation, a corporation of Delaware
No Drawing. Filed Mar. 1, 1967, Ser. No. 619,566
Int. Cl. B32b *17/04, 27/40;* C03c *25/02*
U.S. Cl. 161—176                          4 Claims

ABSTRACT OF THE DISCLOSURE

A body of an elastomer attached to glass fibers by linear polyurethane chains having an organosilane at one end. The inorganic portion of the organosilane is attached to the glass fibers and the other end of each linear polyurethane chain is attached to the body of the elastomer. The attaching chains extend through a soft film former which separates the fibers from each other and from the elastomeric body and allows cushioned movement of the fibers relative to the body of elastomer being reinforced.

BACKGROUND OF THE INVENTION

The present invention relates to composites of resilient elastomeric materials and glass fibers; and to coated glass fibers which will form the desired structures when embedded in the elastomeric material and the elastomeric material is cured.

There has long been a desired to reinforce elastomers, such as rubbers, polyurethanes, polyesters, flexible polyesters, etc. with glass fibers. Glass filters have high tensile strength, high modulus of elasticity, good heat resistance, and durability, but are highly susceptible to mutual abrasion. The glass fiber-elastomer composites produced heretofore have been weak because of poor bonds between the elastomer and the glass fibers and because the glass fibers have broken during severe flexure. The problems involved are sufficiently complex, that although the advantages which such a combination would have, have been known for a long time, glass fiber reinforced elastomers are not used extensively.

In my previous application, Ser. No. 573,267, filed Aug. 18, 1966, now Pat. No. 3,413,186, there is disclosed a method of reinforcing a highly resilient elastomer by means of glass fibers having three coats of different materials thereon. The present invention is an improvement in the some respects over the invention disclosed in my previously filed application in that only one or at most two coatings need be used between the highly resilient elastomer and the glass fibers. In my previously filed disclosure, there is a fusion together of the various layers during the cure of the reinforced product. In the present invention, the film former which surorunds the glass fibers is substantially cured so that a minimum of fusion of the film former with the highly resilient elastomer in which it is embedded occurs. In lieu thereof, a controlled bond between the elastomer and glass fibers is achieved by linear polyisocyanate chains, one end of which is attached to the glass and the other end of which is attached to the elastomer.

SUMMARY OF THE INVENTION

As already indicated, the present invention relates to a structure wherein a highly resilient elastomeric material is reinforced by glass fibers. A film former that is softer than the elastomer being reinforced is positioned between the fibers and the elastomer to act as a cushion which allows movement of the fibers relative to the elastomer. This prevents sharp blows from bending the glass fibers too severely, by allowing some movement of the glass fibers relative to the tougher elastomer. The materials of the elastomer being reinforced should not diffuse into and appreciably change the properties of the softer film former and a bond between the glass fibers and the elastomer is achieved by substantially linear polydiisocyanate chains which extend through the film former. One end of the chains have an organosilane thereon with the inorganic portion of the organsilane attached to the glass. The other end of the chains are attached directly to the highly resilient elastomer being reinforced. A unique, tough, and very flexible attachment, therefore, is provided which permits a desired freedom of movement of the glass fibers which cushions the glass fibers and prevents them from being bent at too sharp an angle. In addition, the softer film former completely separates the glass fibers and prevents their mutual abrasion. Complete separation of the glass fibers is possible because the soft film formers used are readily soluble in organic solvents which more easily penetrate and surround the individual glass fibers. A corresponding penetration and wet out by a molten material or a plastisol is difficult to achieve.

The principal object of the present invention is the provision of a new and improved glass fiber elastomer composite which is more abuse resistant than has been produced heretofore.

Another object of the invention is the provision of more inexpensive glass fiber reinforced rubber articles having greater strength and abuse resistance.

Another object of the invention is the provision of a new and improved coated glass fiber cord for use in reinforcing elastomeric materials.

A still further object of the invention is the provision of a new and improved simpler and more inexpensive method of coating glass fibers to be used in reinforcing elastomers.

Further advantages of the invention will become apparent to those skilled in the art to which it relates from the following description of several preferred embodiments hereinafter described in detail.

DESCRIPTION OF THE PREFERRED EMBODIMENTS

As previously indicated, the present invention provides a unique attachment between glass fibers and a highly resilient elastomer. By the present invention, generally linear polymers are produced in situ with one end of the polymer attached to the glass by an organosilane, and the other end of the polymer attached to the highly resilient elastomer. The linear organic chains extend through a soft film former which allows movement of the glass fibers and chains relative to the resilient elastomer while still preventing contact and mutual abrasion of the glass fibers. The structure can be produced in several methods. According to one method, the organosilane is mixed with the soft film former and an end blocked diisocyanate and the fibers are coated with this mixture. In another method, the organosilane is first applied to the fibers at forming, and thereafter the soft elastomer and the end blocked diisocyanate are mixed and applied in a second step over the top of the organosilane coating.

EXAMPLE 1

A cord made by twisting together seven strands each comprising four groups of 150 glass fibers was heat cleaned to remove all organic matter. The fibers were made of E glass and had a diameter of 0.00035 inch. The heat cleaned cord was given a prime coat by dipping into a toluene solution containing 5 percent of gamma-aminopropyltriethoxy silane. The primed cord was thereafter air dried and dipped into a methylethyl ketone solution containing 10 percent of a generally saturated polyurethane rubber essentially devoid of free isocyanate groups, sold under the trade designation 5702 Estane, and 4 percent of a phenol end blocked tolylene diisocyanate, sold under the trade name Hylene MP and which is a bis phenol adduct of methylene bis (4-phenyl isocyanate). The coating was air dried and the cord again dipped into the ketone solution. The coating was air dried and the process repeated to provide a total of three dip coatings. Sections of this coated cord were placed in parallel touching engagement between 0.070 inch thick layers of a millable urethane polyester rubber, sold under the trade designation Genthane S stock RM 147. Genthane S is a diisocyanate linked generally straight chain unsaturated polyester and the stock RM 147 contains approximately 5 percent of dicumyl peroxide as a cross linking catalyst. Stock RM 147 is made by feeding 100 parts by weight of Genthane S urethane polyester to a cold water jacketed rubber mill. Approximately 0.20 part by weight of stearic acid are added to the running mill, and 30 parts by weight of ISAF grade carbon black are slowly added. These materials are thoroughly worked into the batch for about 30 minutes and thereafter the material is removed from the mill and cooled overnight. Thereafter the cool material is again put into a cold mill and 5 parts by weight of dicumyl peroxide are added and the material mixed for approximately 8 minutes. The sandwich of millable rubber and coated cord was placed in a rubber curing press for one hour at a temperature of 300° F. and a pressure of approximately 100 p.s.i. The composite so produced provided very good adhesion between the urethane rubber layer and coated cord.

By way of comparison, the process given above was repeated excepting that no end blocked diisocyanate was used in the resin solution. The cured composite so produced had substantially no adhesion between the polyurethane rubber and the coated cord.

EXAMPLE 2

The process of Example 1 was repeated excepting that no prime coat of the gamma aminopropyltriethoxy silane was applied to the fibers prior to being coated with the resin solution. Composites made from cords so produced had substantially no adhesion.

From the above tests, it is apparent that a polyurethane film former that is devoid of free reactive groups does not provide a bond to the glass or to a millable urethane rubber, even though a coupling agent is present on the surface of the glass. It is theorized that the end blocked diisocyanate when cured in situ forms long chains which react at one end with the organosilane coupling agent on the surface of the glass and with the millable urethane at the other end. These linear chains are separated by the soft generally completely cured elastomeric inner layer which does not harden appreciably during the cure of the millable urethane layer. This resilient elastomeric layer supports the long polydiisocyanate chains to flexibly resist the straightening of these chains during flexure of the composite. Any type of end blocked diisocyanate such as a bisulfite end blocked diisocyanate can be used to produce the chains, providing the end blocking material is removed from the diisocyanate at the curing temperature.

EXAMPLE 3

A cord made by twisting together 10 yarns each comprising three 150 fiber strands was dipped into a water solution containing 2 percent by weight of gamma aminopropyltriethoxy silane. The cord was pulled through a 37.5 millimeter opening to assure a uniform coating, and was air dried for 5 minutes. The primed cord produced was dipped into a methylisobutyl ketone solution containing 30 percent of Estane 5702, and 8 percent of a phenol end stopped diisocyanate sold under the trade designation of Trancoa 3A. Trancoa 3A unblocks at about 285° F. to regenerate the isocyanate group. The cord so coated was pulled through the 37.5 millimeter opening to provide a uniform coating. Sections of this cord were laid in side by side touching engagement between 0.070 inch thick layers of the millable polyurethane rubber given in Example 1, and the material was cured for one hour at 300° F. in a rubber curing press at approximately 100 pounds per square inch. A one inch wide strip of the composite was tested in a Scott tester which pulled one layer of the cured millable polyurethane rubber from the cords. A force of 100 pounds was required to sustain tear.

By way of comparison and not according to the invention, cords which were previously not primed by the organosilane coupling agent when processed in the same way required only approximately 15 pounds to produce separation of the cured millable urethane rubber layers from the cord.

The following two tests show that the organosilane coupling agent can be added as an ingredient of the resin coating and need not be used as a prime coat.

EXAMPLE 4

A coating solution was made by mixing 330 grams of Trancoa 3A with 4,950 grams of methylethyl ketone. After solution thereof 1,320 grams of Estane 5702 completely reacted linear polyurethane was added as described in Example 1. Thereafter, 3 percent by weight of gamma aminopropyltriethoxy silane was added to this solution. The heat cleaned cord of the type described in Example 3 was dipped into this solution and pulled through a 37.5 millimeter opening to provide a uniform coating. The coated cord was air dried until non-tacky and sections of the cord were laid together in touching engagement between 0.070 inch thicknesses of millable polyurethane rubber as described in Example 1. The composite was cured in a rubber press for one hour at 350° F. at approximately 100 pounds per square inch pressure. A 1 inch wide strip of the laminate so produced when tested in a Scott tester required a force of 100 pounds to produce separation of the urethane rubber from the coated cord.

By way of comparison, the coating process was repeated using the same composition of elastomeric solution, excepting that the solution was devoid of the gamma aminopropyltriethoxy silane. In lieu thereof, the cord was primed by pulling through a methylethyl ketone solution containing 3 percent by weight of a gamma aminopropyltriethoxy silane. Thereafter the primed cord was dried and immersed in the elastomer-end blocked diisocyanate solution. A laminate of the cord so produced required a force of 93 pounds to produce a separation of the polyurethane rubber layer from the coated cord.

From the above it will be celar that the film former intermediate the fibers and the curable polyurethane rubber layer does not provide the bond, but is a resilient cushioning layer the physical properties of which do not change appreciably during the cure of the outer polyurethane rubber layer. This intermediate elastomeric film former should be softer than the material being reinforced so as to accommodate movement of the glass fiber cord while maintaining separation of the fibers. Any elastomer compatible with the millable polyurethane can be used. Elastomers having the desired softness and solubility in organic solvents may be of any suitable type as for example polyesters, polyamides, polyurethanes, etc.

It will be apparent that an organic solution of any elastomeric material has the ability to penetrate between glass fibers to a sufficient degree to maintain an acceptable level of fiber separation. This separation can be enhanced, however, by applying the coating of the present invention of the fibers at forming before the fibers are brought together. The organosilane coupling agent can be mixed with the elastomeric solution containing the end blocked diisocyanate, or can be used as a first treatment followed which the elastomeric solution containing the end blocked diisocyanate is applied. It has been found that the end blocked diisocyanate is necessary, and that substantially no adhesion is achieved where a diisocyanate that is not end blocked is used in the process. It appears that sufficient water is picked up on the surface of the glass during production and storage to "poison" a diisocyanate that is not end blocked, so that an acceptable process is not had if the diisocyanate is not end blocked. Any organo silane having labile hydrogen, such as an amino silane, can be used as a coupling agent between the fibers and the isocayante groups produced in situ upon removal of the end blocking material. The silanes preferably have three hydrolyzable groups such as halogen, or alkoxy groups including ethoxy and methoxy groups and suitable organo portions of the organosilane molecule can be gamma amino propyl, delta amino butyl, and amino alkyl substitute amines such as N-beta (amino ethyl) gamma amino propyltriethoxy silane.

It will be apparent that applicant has produced a unique structure for producing a bond between glass and polyurethane rubber which has highly desirable properties. These properties make the product particularly useful for reinforcing bodies made of elastomers such as the polyurethane rubber used in producing automotive tires, V-belts, conveyor belts, etc.

While the invention has been described in considerable detail, I do not wish to be limited to the particular embodiments above described, and it is my intention to cover hereby all novel adaptations, modifications, and arrangements thereof which come within the practice of those skilled in the art to which the invention relates, and which fall within the purview of the following claims.

I claim:
1. A reinforcement for curable highly resilient elastomeric materials having chemically active hydrogen therein, said reinforcement comprising: a bundle of glass fibers, the individual fibers of which are spaced apart by a non-hardening dissolvable elastomer compatible with said curable elastomeric materials, and substantially devoid of active hydrogen and free isocyanate groups, having dispersed throughout more than approximately 1 percent by weight of an end blocked diisocyanate and an organo silane for coupling to the glass, said elastomer being sufficiently noncrosslinked to be soluble in an organic solvent, and said elastomer and end blocked diisocyanate being deposited in situ as an organic solution.

2. The reinforcement of claim 1 wherein the elastomer is a polyurethane rubber substantially devoid of free isocyanate group.

3. The reinforcement of claim 1 wherein the materials applied to the glass fibers consist essentially of the following solids: approximately 3 percent by weight of gamma amino propyl triethoxy silane; approximately 20 percent by weight of phenol end blocked diisocyanate; and approximately 77 percent by weight of polyurethane rubber devoid of active hydrogen and free isocyanate groups.

4. A reinforced elastomeric structure comprising: a body of polyurethaene rubber, a bundle of glass fibers spaced from said polyurethane rubber, and a layer of a non-hardening elastomer compatible with said polyurethane rubber and substantially devoid of active hydrogen and free isocyanate groups interposed between the polyurethane rubber and said glass fibers, said layer having more than approximately 1 percent by weight of the reaction product of an end block diisocyanate and an organo silane coupling agent reacted in situ with the body of the polyurethane rubber.

References Cited
UNITED STATES PATENTS

| | | | |
|---|---|---|---|
| 2,893,892 | 7/1959 | Pinte et al. | 117—126 X |
| 3,287,204 | 11/1966 | Marzocchi | 161—175 |
| 3,350,345 | 10/1967 | Vanderbilt et al. | 156—329 X |
| 3,391,052 | 7/1968 | Marzocchi | 161—176 |

FOREIGN PATENTS

| | | |
|---|---|---|
| 669,551 | 3/1966 | Belgium. |

JOHN T. GOOLKASIAN, Primary Examiner

R. A. KILLWORTH, Assistant Examiner

U.S. Cl. X.R.

117—126; 156—329, 331; 161—190, 193